(12) United States Patent
Abe et al.

(10) Patent No.: US 6,981,641 B2
(45) Date of Patent: Jan. 3, 2006

(54) COMMUNICATION BOARD ATTACHING UNIT FOR A SMART CARD HANDLING DEVICE

(75) Inventors: Hiroshi Abe, Iwatsuki (JP); Minoru Enomoto, Iwatsuki (JP)

(73) Assignee: Asahi Seiko Co., Ltd., Tokyo (JP)

( * ) Notice: Subject to any disclaimer, the term of this patent is extended or adjusted under 35 U.S.C. 154(b) by 3 days.

(21) Appl. No.: 10/792,263

(22) Filed: Mar. 3, 2004

(65) Prior Publication Data

US 2004/0226998 A1 Nov. 18, 2004

(30) Foreign Application Priority Data

Mar. 3, 2003 (JP) .............................. 2003-056168

(51) Int. Cl.
*G06K 7/06* (2006.01)
(52) U.S. Cl. ...................... 235/441; 235/475; 235/483; 235/486; 235/492
(58) Field of Classification Search ................ 235/492, 235/472.03, 375, 479, 380–382, 486, 435, 235/483, 439, 441, 449, 475, 451, 485; 361/737, 361/236; 340/5.6
See application file for complete search history.

(56) References Cited

U.S. PATENT DOCUMENTS

| | | | | |
|---|---|---|---|---|
| 4,602,351 A | * | 7/1986 | Shimamura et al. .......... 365/52 |
| 5,010,239 A | * | 4/1991 | Mita ........................ 235/441 |
| 5,382,781 A | * | 1/1995 | Inoue ........................ 235/384 |
| 5,554,840 A | * | 9/1996 | Saroya ....................... 235/441 |
| 5,594,233 A | * | 1/1997 | Kenneth et al. ............. 235/492 |
| 5,698,832 A | * | 12/1997 | Someya et al. ............. 235/449 |
| 5,729,000 A | * | 3/1998 | Sugimoto ................... 235/441 |
| RE35,992 E | * | 12/1998 | Huis et al. .................. 235/440 |
| 5,850,079 A | * | 12/1998 | Ohwa et al. ................ 235/475 |
| 5,907,814 A | * | 5/1999 | Jubert ........................ 455/558 |
| 5,912,446 A | * | 6/1999 | Wong et al. ................ 235/449 |
| 5,929,414 A | * | 7/1999 | Saitoh ........................ 235/380 |
| 5,984,183 A | * | 11/1999 | Moriya ....................... 235/440 |
| 6,045,043 A | * | 4/2000 | Bashan et al. ............. 235/441 |
| 6,068,186 A | * | 5/2000 | Jubert ........................ 235/441 |
| 6,068,193 A | * | 5/2000 | Kreft ......................... 235/492 |
| 6,082,615 A | * | 7/2000 | Cesaire et al. ............. 235/379 |
| 6,085,974 A | * | 7/2000 | Inoue ........................ 235/380 |
| 6,116,933 A | * | 9/2000 | Willhite ..................... 439/260 |
| 6,146,195 A | * | 11/2000 | Chang ..................... 439/541.5 |
| 6,168,082 B1 | * | 1/2001 | Benjamin et al. .......... 235/475 |
| 6,216,954 B1 | * | 4/2001 | Kuwamoto et al. ........ 235/486 |
| 6,250,552 B1 | * | 6/2001 | Hirasawa ................... 235/475 |
| 6,411,200 B1 | * | 6/2002 | Kawagishi .............. 340/10.51 |
| 6,519,158 B2 | * | 2/2003 | Kashima .................... 361/737 |
| 6,616,050 B1 | * | 9/2003 | Oki et al. ................... 235/479 |
| 6,830,194 B2 | * | 12/2004 | Hsiao ........................ 235/492 |
| 6,839,772 B1 | * | 1/2005 | Kowalski et al. ............. 710/5 |
| 6,866,201 B2 | * | 3/2005 | Abe et al. .................. 235/493 |

* cited by examiner

*Primary Examiner*—Karl D. Frech
*Assistant Examiner*—Daniel Walsh

(57) ABSTRACT

A smart card handling device with a communication board attaching unit including a first base attached to the card handling device and a second base for carrying a set of one or more communication boards for communicating with a non-contact type smart card or a contact type smart card along a transporting passageway. The first base and the second base have a complementary mounting to suitably mate together. The communication board attaching unit can selectively pivot to enable a recycling operation.

12 Claims, 5 Drawing Sheets

COMMUNICATION BOARD ATTACHING UNIT FOR A SMART CARD HANDLING DEVICE

CROSS-REFERENCE TO RELATED APPLICATION

This application is based on an application number 2003-056168 filed in Japan, dated Mar. 3, 2003.

FIELD OF THE INVENTION

The present invention is related to a smart card handling device and more particularly to a smart card handling device that can communicate with multiple types of smart cards.

DESCRIPTION OF RELATED ART

Smart cards and smart card handling devices are well known and have application in a wide variety of situations including transportation, debit purchasing, and identification. Smart cards may appear to be very similar, but the underlying technology may be quite diverse. For example, non-contact type smart cards have an antenna and communicate with a smart card reading and writing device through radio frequency (RF) signals. Alternatively, contact type smart cards have one or more terminals on the surface or edges of the smart card and communicate with the smart card reading and writing device through signals transmitted through a direct electrical contact using wires or other contacts on the terminals.

Smart card technology is a competitive and growing market, and new standards are being developed for communication protocols to facilitate security and other concerns. Hence, operators of many smart card systems can find that it is expensive and time consuming to maintain multiple different types of smart card systems when protocols or user demands change. Accordingly, there is a need to provide an efficient and economical way to modify an existing installed smart card handling device in order to communicate with a different type of smart cards.

SUMMARY OF THE INVENTION

The present invention addresses the limitations of the prior art by providing a card handling device with a communication board attaching unit that can detachably mount one or more communication boards to enable communication with different types of smart cards. When the type of card or the communication protocol changes, only the detachable communication boards will need to be replaced or modified saving both maintenance time and costs.

The card handling device includes a card receiving unit, a card transporting unit, a magnetic card handling unit, a communication board attaching unit, and a recycling unit. The card receiving unit receives a card from a user and transports the card to the interior of the card handling device. The card handling device can also return the card to the user. The type of card can include a magnetic card having magnetic strips, a non-contact type smart card including a processor and memory with a suitable antenna and transceiver, and a contact type smart card including a processor and memory with one or more external terminals for communicating with the contact type smart card using an electrical connection. The card handling device includes a transporting unit for moving a card within the card handling unit along a transporting passageway.

The type of communication boards attached to the communication board attaching section will determine the type of smart card may be used with the card handling device. If the desired type of smart card changes, the corresponding type of communication boards may also be efficiently and economically changed by simply attaching the new communication boards to the communication board attaching section.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the intention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
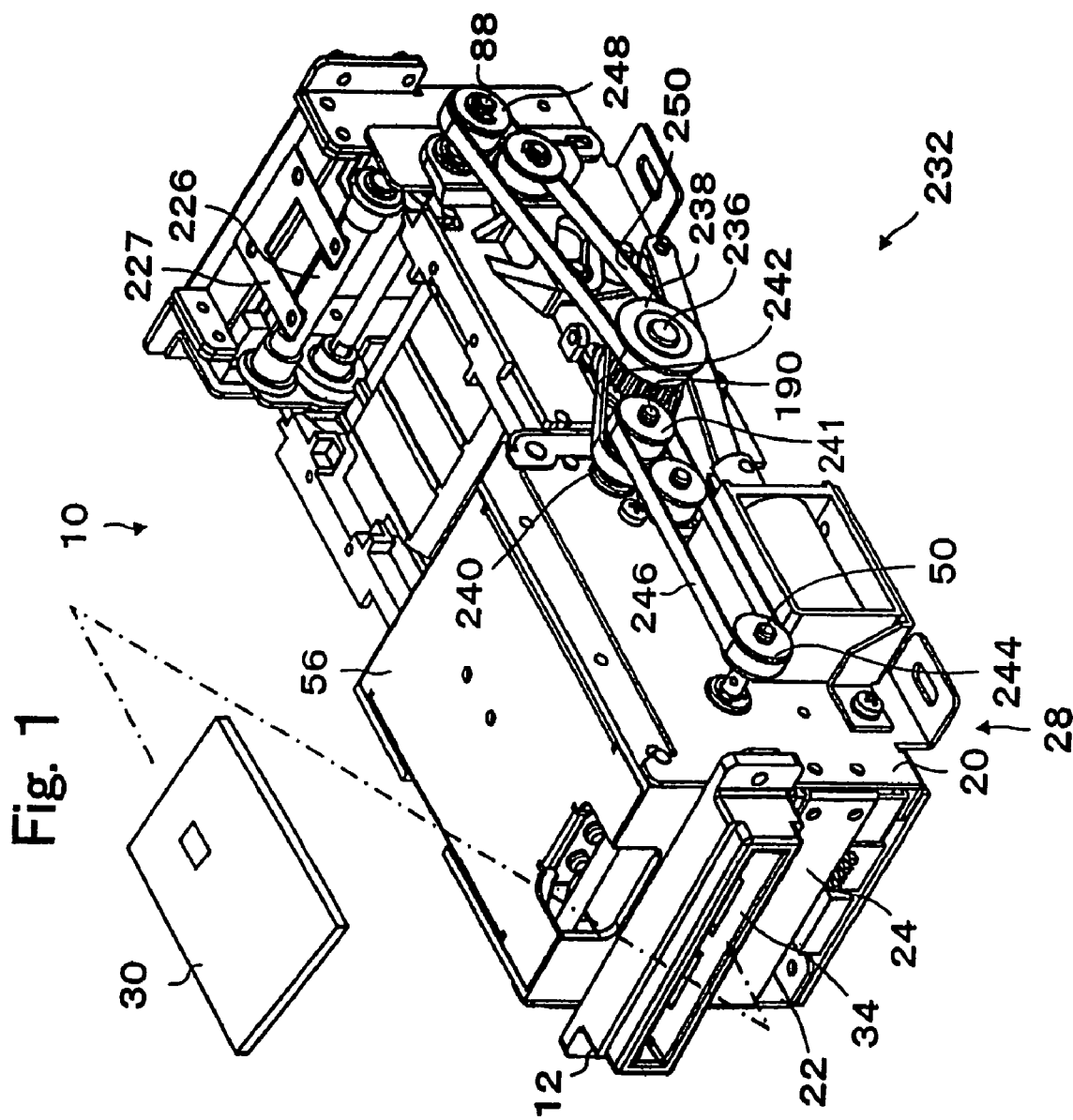
FIG. 1 shows a perspective view of the card handling device according to an embodiment of the present invention.

In reference to FIG. 1, the card handling device 10 for handling a smart card 30 is explained. Smart cards 30 exist in many varieties and typically contain information that is read from or written to the smart card 30 using either contact or non-contact means. A smart card typically includes the ability to perform some operation on the data carried by the smart card 30 and usually has some data processing capability such as by including a microprocessor unit and a memory unit. A contact-type smart card typically has terminals on the exterior surface of the smart card 30 which allows the card handling device 10 to electrically connect to the external terminals for establishing communication with the smart card 30.

Alternatively, for a non-contact type smart card 30, there are typically no contacts on the surface of the card for establishing communication with the card, and communication is usually accomplished in a wireless fashion using a transmitter and antenna in the card handling device 10 that communicates wirelessly to an antenna and receiver in the sealed smart card 30. It is desirable for a card handling device 10 to be able to interact with several different types of cards including magnetic cards without an associated processing capability. It is economical for a card handling device 10 to be able to receive, transport, and dispense various types of cards having various dimensions within given ranges.

The card handling device 10 has a driving unit 232 for transporting the cards within the card handling device 10 and between the various units. The structure of the card handling device 10 is built upon a frame 28 which includes side frames (20, 22) which are held a fixed distance apart by cross-member stays (24, 26). A card moves horizontally left and right along a transport passageway 32, but this orientation is not limiting since the card is positively gripped at all times during the transport allowing the orientation can be tilted off horizontal, and may be vertical.

Figure 2:
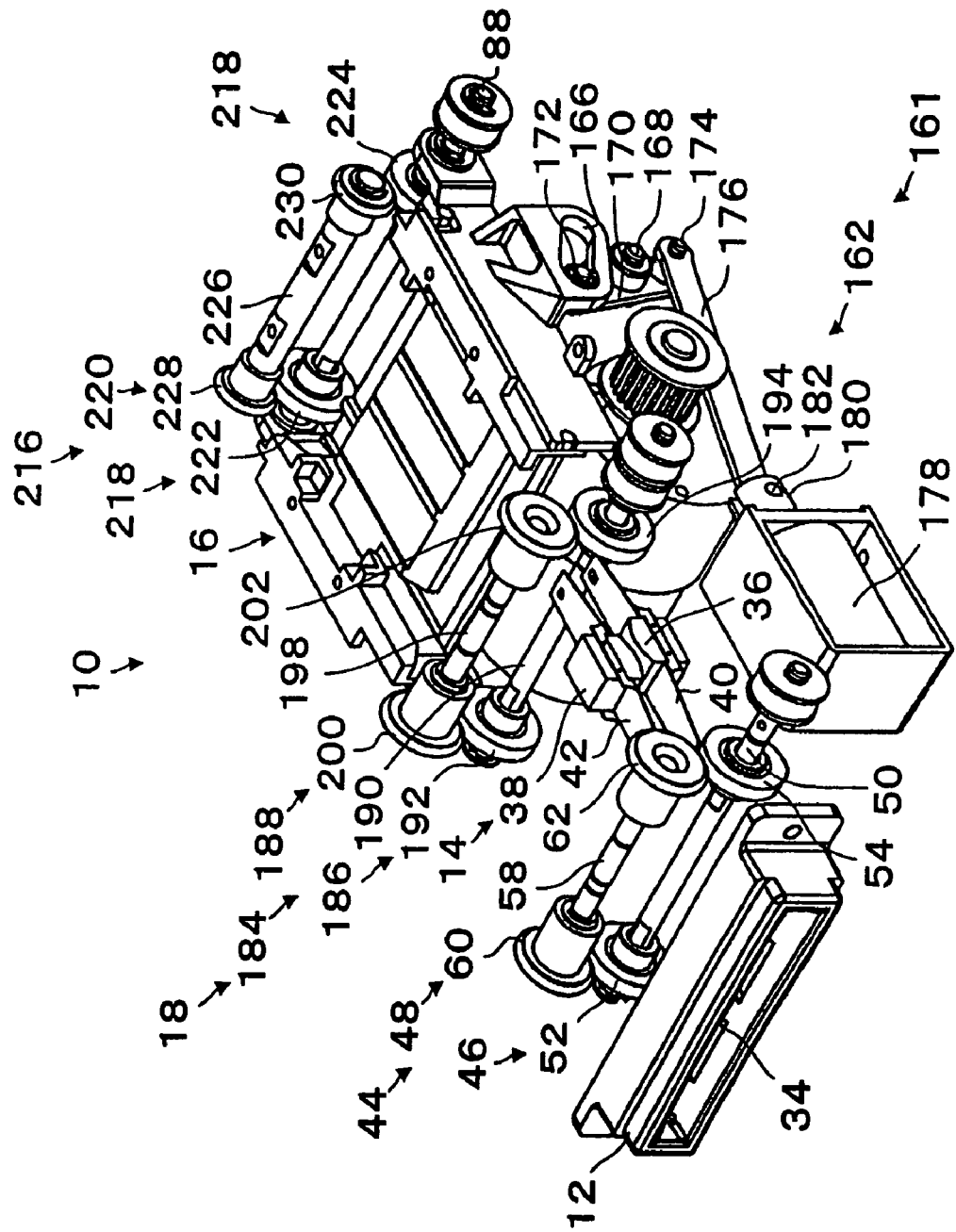
FIG. 2 is a perspective view of an interior partial view according to an embodiment of the present invention.

In reference to FIG. 2, the card handling device 10 of the presently preferred embodiment includes a card receiving unit 12, a magnetic card handling unit 14, a communication board attaching unit 16, a card transporting unit 18, and a recycling unit 161. The communication board attaching unit 16 can receive either non-contact type or contact type communication boards for accessing various types of smart cards 30.

Figure 3:
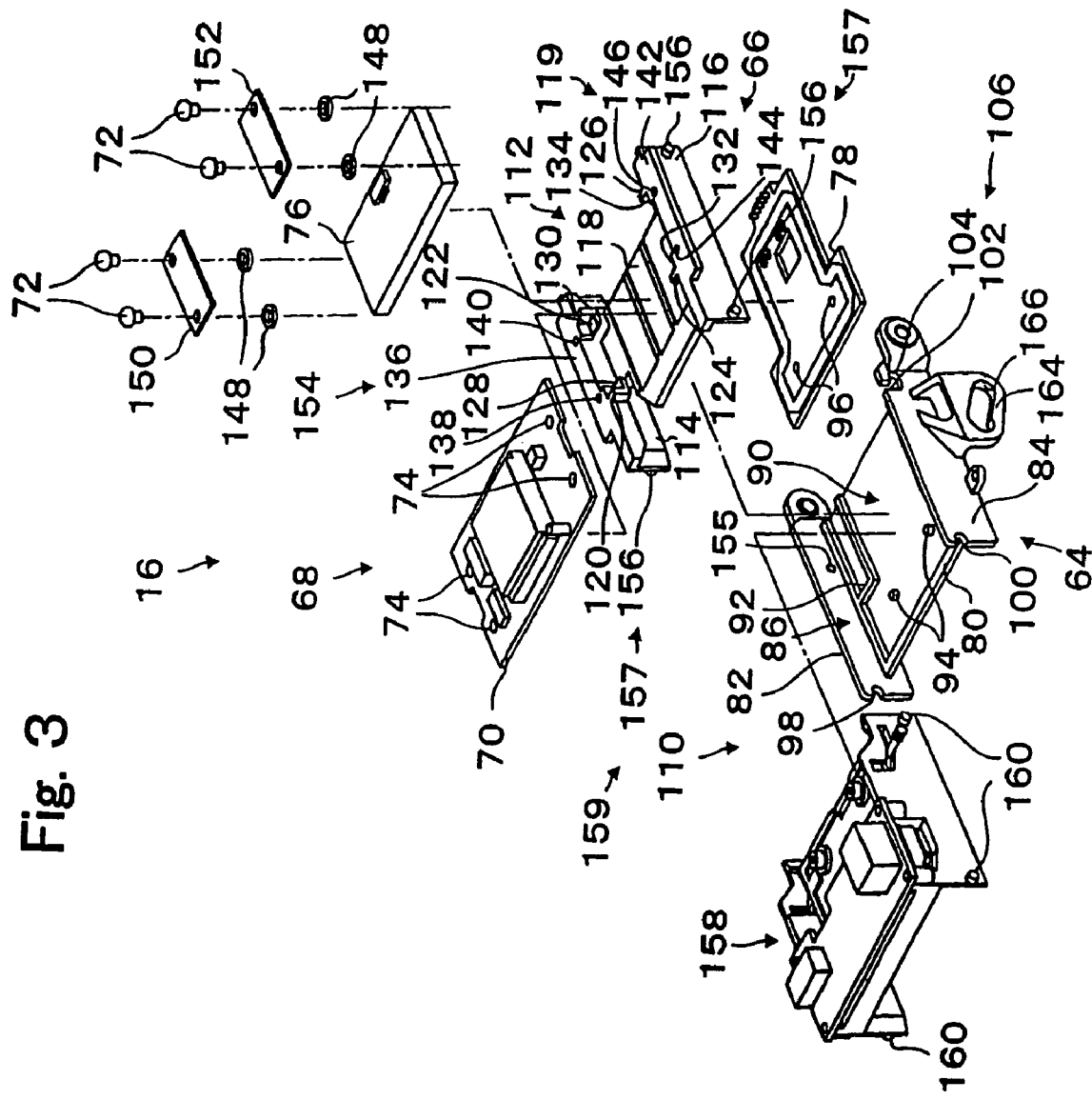
FIG. 3 is an exploded perspective view of the communication board attaching unit according to an embodiment of the present invention.

In reference to FIG. 3, an exploded view of the communication board attaching unit 16 showing various components that may be attached to the communication board attaching unit 16. Specifically, the wire-based contact-type communication board 158 may be mounted on the first base 64 forming the lower one-touch attaching section 110 to accommodate contact-type smart cards 30 and attached to the communication board attaching unit 16. Alternatively, wireless communication boards (70, 76, and 78) for non-contact-type smart cards 30 may be mounted above and below the second base 66 forming the upper one-touch attaching section 157 and attached to the communication board attaching unit 16.

The first base unit 64 and the second base unit 66 define a universal attachment section so that other types of communication units for a plurality of different smart card types can be assembled onto the second base unit 66 and detachably mounted on the first base unit 64. This interchange capability allows the card handling device to be efficiently and economical changed to handle a different smart card type without changing the physical transport and drive mechanism.

Figure 4:
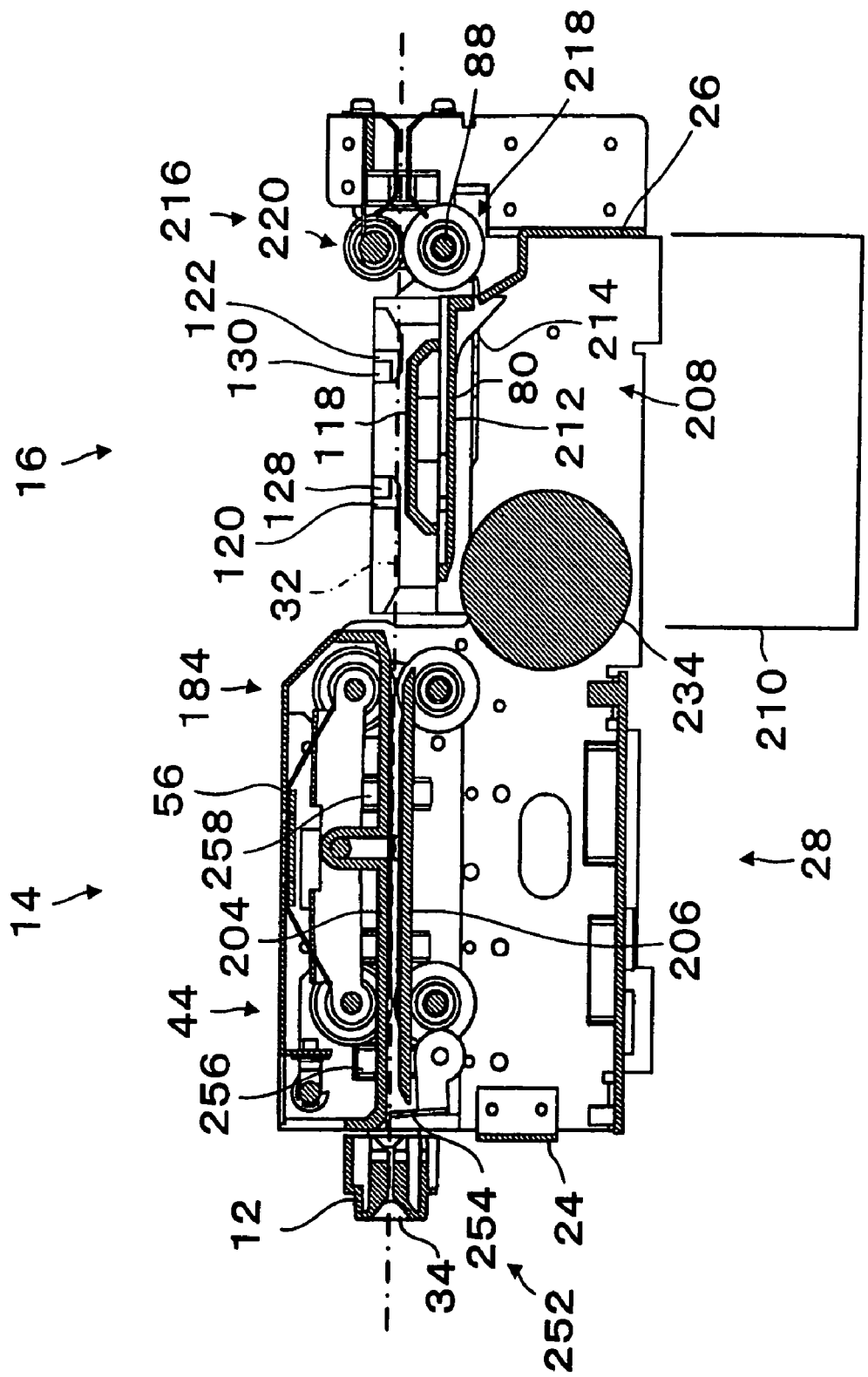
FIG. 4 is a cross-sectional view showing the card handling device with the communication board attaching unit in an initial position to permit the passage of a received smart card over the communication board attaching unit according to an embodiment of the present invention.

In reference to FIG. 4, the card receiving unit 12, the magnetic card handling unit 14, and the communication board attaching unit 16 are located along a transporting passageway 32. The card receiving unit 12 includes a card slot 34 that is oriented horizontally to receive the end of a rectangular card inserted into the card receiving unit 12.

Figure 5:
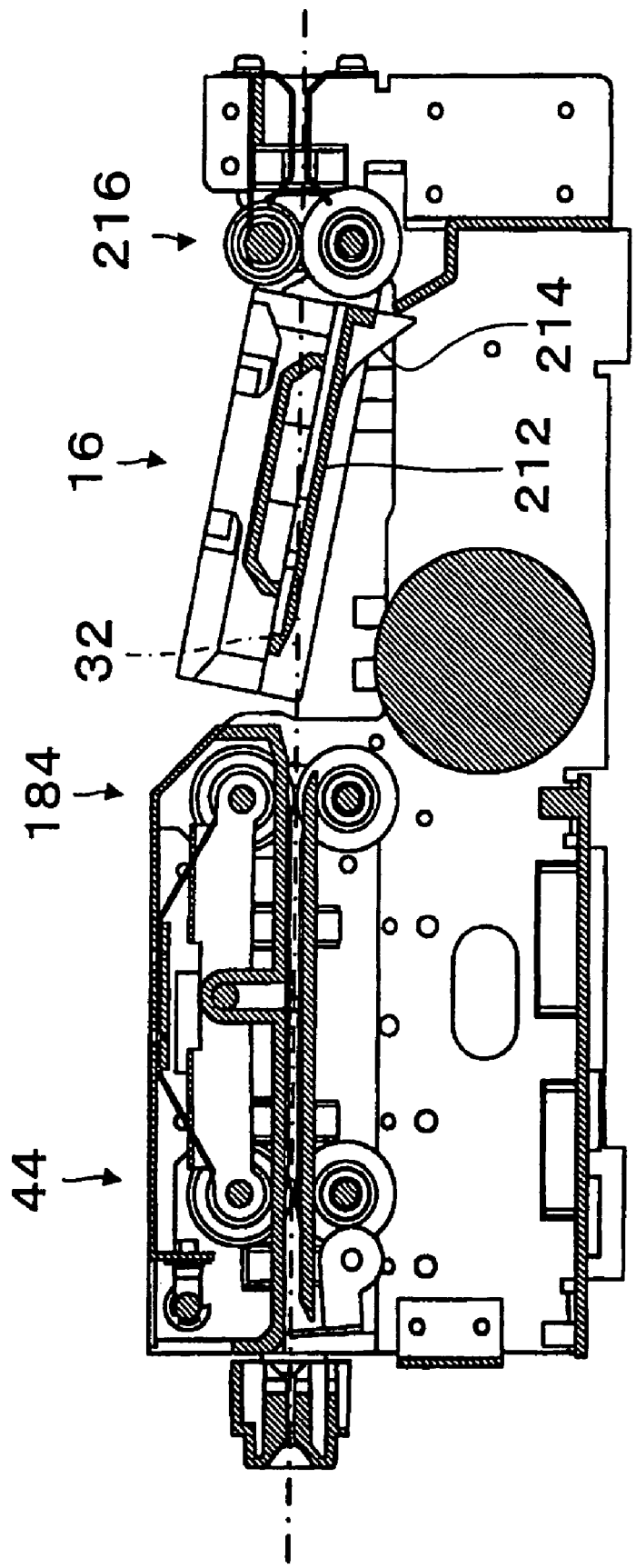
FIG. 5 is a cross-sectional view showing the card handling device with the communication board attaching unit rotated to recycle the received smart card according to an embodiment of the present invention.

In reference to FIG. 5, the communication board attaching unit 16 is rotated during a recycling operation where the lower surface of the communication board attaching unit 16 crosses the transporting passageway 32 to deflect the path of a transported card into a recycling section 210.

In reference to FIG. 2, the magnetic card handling unit 14 includes a first magnetic head 36 for reading and writing a magnetic tape on a JIS-1 type magnetic card and a second magnetic head 38 for reading and writing a magnetic tape on a JIS-2 type magnetic card. The first magnetic head 36 is mounted near the middle of a leaf spring 40 in a face-up position below the transporting passageway 32 for reading and writing the lower surface of a magnetic card. The second magnetic head 38 is mounted near the middle of a leaf spring 42 in a face-down position above the transporting passageway 32 for reading and writing the upper surface of a magnetic card.

The first magnetic head 36 and the second magnetic head 38 are slightly offset along the direction of the passageway 32 so that their respective magnetic read and write heads do not touch when a card is not inserted since they are pushed towards each other in a vertical direction under the urging of their respective leaf springs (40, 42). One end of each of the leaf springs (40, 42) is affixed to a bracket while the other end of the leaf spring can slide onto another bracket. The second magnetic head 38 is carried within a detachable supporting box 56. Only one magnetic head for each side of the magnetic card is shown and described. One of ordinary skill in the relevant art would appreciate that more than one magnetic head for each side may be used to accommodate magnetic cards with more than one magnetic stripe on a side.

A first transporting unit 44 is disposed between the card receiving unit 12 and the magnetic heads (36, 38) along the transporting passageway 32. The first transporting unit has rollers for gripping an inserted card, and for securely moving the inserted card along a portion of the path along the transporting passageway 32. The first transporting unit 44 includes a first driving roller 46 which is located below the transporting passageway 32 and a first pressing roller 48 which is located above the transporting passageway 32. The first driving roller 46 includes a first rotating shaft 50 which extends out beyond the side frames (20, 22) and is supported for rotation by the side frames (20, 22).

The first rotating shaft 50 has rollers (52, 54) which are affixed near both ends of the portion of the first rotating shaft 50 between the side frames (20, 22). Rollers (52, 54) have a structure including a disk-shaped body and a ring around the circumference of the body. The body can be composed of resin or metal, and the ring can be composed of rubber or another suitable elastic material for gripping the surface of a card during transporting along the transporting passageway 32.

The first pressing roller 48 is flexibly supported above the first driving roller 46, rather than rigidly supported, so that the first pressing roller 48 can move up or down in a vertical fashion in order to accommodate transporting cards of different thicknesses along the transporting passageway 32. The first pressing roller 48 includes a shaft 58 that is supported at each end within the detachable supporting box 56 shown in FIGS. 1 and 4. Rollers (60, 62) are similar in composition to rollers (52, 54) and are attached near the end of the shaft 58 between the side walls of the supporting box 56. The rings of rollers (60, 62) on shaft 58 are positioned above the rings of rollers (52, 54) on shaft 50 at a distance which is less than the thinnest expected card so that a card may be gripped between the corresponding upper and lower rollers in order to transport the card along the transporting passageway 32.

In reference to FIG. 3, the communication board attaching unit 16 includes a first base 64 and a second base 66. A set of one or more selected communication boards can be easily attached and detached at the communication board attaching unit 16 to permit changing the type of smart card that can be used in the smart card handling device.

In one embodiment, a non-contact type smart card 30 can be used with the card handling device 10 by attaching a set of one or more non-contact type communication boards to the communication board attaching unit 16. When the non-contact smart card is positioned along the transporting passageway adjacent to the non-contact type communication unit, information can be exchanged with the non-contact type smart card in order to wirelessly communicate with the non-contact smart card 30.

The first communication board unit 68 can include a first communication board 70 and a second communication board 76 which can be attached to the second base 66 for wirelessly communicating with a non-contact type smart card 30. For example, the first communication board unit 70 can be of type A which conforms to an International Standard ISO 14443A also known as the "MiFare" standard. Portable smart cards 30 are conforming to the MiFare standard are available from many manufacturers including Philips Semiconductors headquartered in Eindhoven, The Netherlands.

The second communication board 76 can be of type B which conforms to the "FeliCa" standard and is available from many suppliers including SONY Corporation. The non-contact type smart card 30 itself is typically rectangular in shape includes an antenna and a wireless communication circuit. Such a smart card 30 can be used as a payment card for ticketing systems in public transportation or an electronic purse, for example.

The first communication board unit 70 and the second communication board unit 76 can be secured to the second base 66 by placing the second communication board unit 76 into a recessed portion of the second base 66 and placing the first communication board unit 70 on top of the second communication board unit 76 so that the through holes 74 are aligned with corresponding screw holes in the second base 66. Fixing means 72 can be screws that can extend through corresponding holes in holding plates (150, 152) and into the through holes 74. The fixing means 72 can then be used to fix the holding plates (150, 152) so that they retain the first communication board 70 and the second communication board 76 in position on the second base 66. The fixing means 72 can be a screw, a one-touch fixing pin, or some other suitable fastener. The third communication board 78 is T-shaped for use with the MiFare standard and includes an antenna unit. The communication circuit for the third communication board 78 is attached to the frame 28.

Alternatively, a contact type smart card 30 can be used with the card handling device 10 by attaching a set of one or more contact type communication boards to the communication board attaching unit 16. When the contact smart card is positioned along the transporting passageway adjacent to the contact type communication unit, information can be exchanged with the contact type smart card in order to communicate with the non-contact smart card 30 through one or more direct electrical connections.

The first base 64 includes a first board 80 which is in a horizontal position and left side board 82 and right side board 84 which are located vertically on the sides of the first board 80. The first board 80, the left side board 82 and the right side board 84 define a groove section 86 that opens in an upward manner below the transporting passageway 32.

In reference to FIGS. 3–5, the end of the first base 64 away from the magnetic card handling unit 14 can pivot on a third rotating shaft 88. The pivoting of the first base 64 allows the communication board attaching unit 16 to break the path of the transporting passageway 32 so that a transported card can be deflected by the bottom surface of the first base and into a recycling section 210 to be recycled. The third rotating shaft 88 is attached at side frames 20 and 22. The third communication board attaching section 90 for the third communication board 78 is on the upper surface of the first board 80.

The third communication board attaching section 90 is a T-shaped groove for receiving the third communication board 78, and the shape of the T-shaped groove is defined by a rib 92 on the first board 80. Plural projections 94 on the upper surface of the third board attaching section 90 are position-determining pins, and can fit into position-determining holes 96 on third communication board 78.

Generally, the first board 80 is located directly below the transporting passageway 32. Notches (98, 100) are located over first board 80 of the side surfaces of left/right side plates (82, 84) at the end of the communication board attaching unit 16 that is close to the card receiving unit 12. An L-shaped attaching groove 106 is formed by a perpendicular groove 102 which extends downwards from the upper edge of the right side plate 84 and a horizontal groove 104 which is continuous with the perpendicular groove 102 at the end of the communication board attaching unit 16 that is away from the card receiving unit 12. The one-touch attaching section 110 is defined by the notches 98 and 100 and attaching groove 106.

The second base 66 includes a second board 112 which is substantially flat member, second left side plate 114 and second right side plate 116 which extend upwards from both sides of the second board 112. The surface 118 of the second board 112 is located close below the transporting passageway 32 to guide and retain the smart card 30.

Supporting sections 120, 122, 124 and 126 project inwards toward the center of the transporting passageway 32 from the upper section of second left side plates 114 and second right side plate 116. The underside surfaces of supporting sections 120, 122, 124 and 126 are parallel to surface 118 by a predetermined distance. In other words, the underside surfaces of supporting sections 120, 122, 124 and 126 are located over and near the transporting passageway 32, while the surface 118 is located under transporting passageway 32. A smart card 30 is guided by the underside surfaces of supporting sections 120, 122, 124 and 126 and the upper surface 118. Supporting sections 120, 122, 124 and 126 have notches 128, 130, 132 and 134 that are designed to fit the second communication board 76 in order to securely hold the second communication board 76 in a position above the transporting passageway 32.

The upper surface 136 of the second left side plate 114 is parallel to the surface 118 and has screw holes 138 and 140 beside the supporting sections 120 and 122. The upper surface 142 of the second right side plate 116 is parallel to the surface 118 and has screw holes 144 and 146 beside the supporting sections 124 and 126. The second communication board 76 is fitted to the notches 128, 130, 132 and 134, and kept by holding plates 150 and 152 that are fixed at second base 66 by screws 72 which are screwed into screw holes 138, 140, 144 and 146. Also, holding plates 150 and 152 are fixed at surfaces 136 and 142 through spring washers 148.

The first communication board attaching section is the upper surfaces 136 and 142 of the second base 66. The lower surfaces of the left and right ends of the first communication board 68 is affixed to the upper surfaces 136 and 142 and are fixed at the second base 66 by screws 72 which penetrate through corresponding holes 74.

The upper one-touch attaching section 157 is located on the lower side of the second base 66 and mates with the corresponding lower one-touch attaching section 110 on the upper side of the first base 64. A projection 156 protrudes from the side surface of the second left side plate 114 and extend in a direction away from the transporting passageway 32 above the surface 118. Similarly, more projections 156 protrude from the side surface of the second right side plate 116 and extend in a direction away from the transporting passageway and opposite from the projection 156 protruding from the second left side plate 114.

When second base 66 is mounted or attached to the first base 64, the right-rear projection 156 as shown in FIG. 3 is moved downwards along perpendicular groove 102 of the attaching section 106. As the right rear projection 156 reaches the bottom portion of the perpendicular groove 102, the other projections 156 on the second left side plate 114 and the second right side plate 116 become aligned with the notches (98, 100) of the left side plate 82 and the right side plate 84 which are located at the ends of the left side plate 82 and right side plate 84 that are closest to the magnetic card handling unit 14.

Once the projections 156 are aligned, the second base 66 is moved in a direction along the axis of the transporting passageway 32 away from the magnetic card hand ling unit 14, and projections 156 are then fitted into horizontal groove 104, notches 98 and 100. Therefore second base 66 is attached to the first base 64 and a holding screw (not shown) is screwed into the second base 66 through the penetrate hole 155 and is secured at the first base 64. At this point, the first left side plate 114 and the second right side plate 116 are disposed in the groove section 86 inside of left side plate 82 and right side plate 84.

Therefore one-touch attaching unit 159 comprises the one-touch attaching sections 110 and 157. The third communication board 78 is fitted into the third communication board attaching section 90, and the second base 66 is attached at the first base 64 as discussed. The third communication board 78 is pressed to the underside surface of the second board 112, and is held in position.

The first communication board attaching unit 154, the second communication board attaching section 119, and the third communication attaching section 90 are arranged in layers towards the transporting passageway 32. Further, the second communication attaching section 119 is located adjacent to and positioned above the transporting passageway 32 while the first communication board attaching unit 154 is located over the second communication attaching section 119. The third communication board attaching section 90 is located below and adjacent to the transporting passageway 32. The communication boards are stacked at their predetermined positions so the stopping position of smart card 30 or the transporting process remain unaltered.

When a contact type smart card is used, a contact type communication board 158 is attached at first base 64 in a similar manner as was described for the attaching of the second base 66. The contact type communication board 158 can be attached at first base 64, because projections 160 are fitted into one-touch attaching section 110, the same as the projections 156. The contact type board 158 includes the contact terminals for smart card 30 in the transporting passageway 32 and the communication circuit.

In reference to FIGS. 2–3, the recycling unit 161 for non-contact type smart card 30 is explained. The recycling unit 161 includes at least the moving unit 162, the second transporting unit 184 and the diverting unit 208. First, the moving unit 162 of communication board attaching unit 16 is explained. The elongated hole 166 is located at the driven plate 164 which extends downwards from the right side plate 84 and slants horizontally. The roller 172 is inserted into the elongated hole 166. The roller 172 is attached at the lever 170 which is pivotable on shaft 168 that is fixed at the side frame 20. Pin 174 is fixed at the lower end of lever 170. An end of rod 176 is pivotable on pin 174. The other end of rod 176 is attached to the plunger 180 of solenoid 178 by pin 182 and is pivotable. The moving unit 162 has a function where the communication board handling unit 16 is pivoted to cross the transporting passageway 32. Although a solenoid is described herein, the moving unit 162 can be changed to use an air-cylinder and a linear motor, for example, and is not considered to be limited.

The second transporting unit 184 is located between the magnetic card handling unit 14 and the communication board attaching unit 16. The second transporting unit 184 includes second driving roller 186 which is located under the transporting passageway 32 and the second pressing roller 188 which is located above the transporting passageway 32 similar to the first transporting unit 44. The second driving roller 186 includes the rollers 192 and 194 which are the same as rollers 52 and 54 and are fixed near the ends of the second rotating shaft 190.

The second rotating shaft 190 is supported at the side frames (20, 22) and is rotatable. Second pressing roller 188 includes rollers (200, 202) which can rotate on shaft 198. Rollers 200 and 202 have the same structure to rollers 60 and 62. Shaft 198 is flexibly attached at the supporting box 56 in the same manner as the first shaft 58.

In reference to FIG. 4, the guiding boards 204 and 206 are located above and below transporting passageway 32, respectively, between the card receiving unit 12 and second transporting unit 184 and serve to guide the smart card 30.

In reference to FIG. 4, the diverting unit 208 for a recycled smart card 30 is explained. The diverting unit 208 facilitates the function where the smart card 30 is transported to the recycling section 210 that is located below the communication board attaching unit 16. The underside surface of the first board 80 of the first base 64 is a guiding plate 212. The second guiding section 214 is shaped continuously with the guiding plate 212 and is bent at an obtuse angle with the guiding plate 212. The second guiding section 214 protrudes downwards from near the end of the guiding plate 212 from the underside surface of the second board 80 and is roughly triangular in shape. Alternatively, the guiding plate 212 can be rail-like in shape, and extend along the transporting passageway 32 affixed to the underside of the first board 80.

In reference to FIG. 5, when the communication board attaching unit 16 pivots at the third rotating shaft 88, the guiding plate 212 crosses the transporting passageway 32. The guiding plate 212 crosses transporting passageway 32 at an obtuse angle denoted the first angle. At the same time, the plane defined by the surface of the second guiding section 214 crosses the transporting passageway 32 at a different obtuse angle denoted a second angle, where the second angle is greater than the first angle. An advantage of using two guiding sections (212, 214) and two angles angles (first, second) is that the length of the card transporting direction of communication board attaching unit 16 becomes shorter.

The third transporting unit 216 is located adjacent to the communication board attaching unit 16 on the side opposite the magnetic card handling unit 14. The structure of the third transporting unit 216 is similar to both the first transporting unit 44 and the second transporting unit 184. The third transporting unit 216 includes a third driving roller 218 which is located below transporting passageway 32 and a third pressing roller 220 which is located above the transporting passageway 32.

The third driving roller 218 includes rollers 222 and 224 which are fixed near the ends of the third rotating shaft 88 between the side frames (20, 22). The third rotating shaft 88 is supported at the side frames 20 and 22 and is rotatable. The third pressing roller 220 includes rollers 228 and 230 which are rotatable on shaft 226. Rollers 228 and 230 are made of the same composition as rollers 52 and 54 and perform a similar function.

In reference to FIG. 1, the shaft 226 is held under tension by a leaf spring 227 which is supported by the side frames 20 and 22. The distance between the first transporting unit 44 and the second transporting unit 184 is such that a smart card 30 of expected length is held by both units to prevent a condition where the smart card 30 is not positively driven. Similarly, the distance between the second transporting unit 184 and the third transporting unit 216 is such that when the smart card is held by the second driving roller 192 and second pressing roller 200, shortly after it passes through the third driving roller 218 and the third pressing roller 220.

In another embodiment, the card handling device 10 can dispense new or replacement cards to the card receiving unit 12. In this embodiment, when a new smart card is dispensed to card receiving unit 12, a card dispensing unit (not shown) is attached at the right side of the third transporting device 216 as shown in FIGS. 4–5. When new cards are not dispensed, the third transporting device 216 is not needed. If the card handling device 10 does not dispense new cards, the third rotating shaft 88 may be fixed instead of rotating.

The transporting unit 18 includes at least the first transporting unit 44 and the second transporting unit 184. When a new smart card is dispensed, transporting unit 18 includes third transporting unit 216. The function of transporting unit 18 is to transport the smart card 30 within the card handling device 10, in a predetermined direction, to a predetermined position. Although rollers are used in the presently preferred embodiment, the transporting unit 18 can be changed to other type such as including belts for contacting the surface of the smart card 30 and moving within the card handling device 10.

In reference to FIGS. 1–2, the driving unit 232 for driving the first transporting unit 44, the second transporting unit 184 and the third transporting unit 216 is explained. A timing pulley 238 is fixed on an output shaft 236 of a motor 234 (shown in FIG. 4). The motor 234 drives a speed reducing gearbox which is located below the transporting passageway 32 between the second transporting unit 184 and the communication board attaching unit 16. The timing belt 242 couples the movement of a timing pulley 240 which is fixed on the second rotating shaft 190 and the timing pulley 238. The timing belt 246 couples the movement of a timing pulley 244 which is fixed on the first rotating shaft 50 and the timing pulley 242 which is fixed on the second rotating shaft 190.

Timing belt 250 couples the movement of the timing pulley 238 and the timing pulley 248 which is fixed on the third rotating shaft 88. The first driving roller 46, the second driving roller 186 and the third driving roller 218 rotate synchronously and at the same speed because timing pulleys 240, 244 and 248 are the same diameter. The driving device 232 can be changed to a different type which operates the transporting unit 18 at a similar speed.

In reference to FIG. 4, a shutter unit 252 which is located between card receiving unit 12 and first transporting unit 44 is explained. The shutter unit 252 includes a plate 254 and a solenoid (not shown) that moves the plate 254. When the card handling device 10 is initially activated, the plate 254 is moved downward below the path of the transporting passageway 32. After the smart card 30 is inserted and the first sensor 256 which is located between the receiving unit 12 and the first transporting unit 44 senses a non-detection condition, the plate 254 is moved back into a position blocking the transporting passageway 32.

When the second sensor 258 which is located between the first transporting unit 44 and the second transporting unit 184 senses a non-detection condition, the second transporting unit 184 is halted so the smart card 30 stops at a position where an end of the smart card 30 is held by second transporting unit 184 while the other end of the smart card 30 is positioned within the communication board attaching unit 16. In this position, the antenna section of the smart card 30 is properly aligned with the surface 118 for the non-contact type smart card 30 to communicate with the non-contact type communication boards.

Also, plate 254 blocks the transporting passageway 32 to prevent the smart card 30 from being pulled out. After the non-contact type communication boards have completed their communication with the non-contact smart card 30, the smart card is dispensed to a user through the card receiving unit 12. During this process of dispensing to the user the second sensor 258 senses a detect condition and the plate 254 is moved downward out of the transporting passageway 32 to permit the dispensing of the smart card 30 to the user.

When smart card 30 is inserted into card slot 34 and is moved along transporting passageway 32 in the right shown in FIG. 4 by first transporting unit 44 and second transporting unit 184. When the trailing end of smart card 30 is not detected by second sensor 258, the transporting unit 18 halts operation and the smart card 30 stops in a position where it is held by the second transporting unit 184.

The leading end of section of smart card 30 in the direction of travel to the communication board attaching unit is supported by the surface 118 of the second board 112 and the underside surfaces of the supporting sections 120, 122, 124 and 126 described above. In this position, the smart card 30 may be written to and read from by the communication boards. The attached communication board selected from among the first communication board 68, the second communication board 76, and the third communication board 78 communicates to the antenna of smart card 30. When a predetermined read/write communication process is executed, afterwards a returning signal is receives from the controller (not shown).

By this returning signal, the motor 234 rotates in the opposite direction and the first driving roller 46, the second driving roller 192 and the third driving roller 218 rotate in the counter clockwise direction by the driving unit 232 as shown in FIG. 4. By this process, the smart card 30 can be returned to a user through the card slot 34 by the second transporting unit 184 and the first transporting unit 44.

The sensors 256, 258 and others send position indicating information signals to the controller. The controller then sends command signals to the motor 234, the solenoid 178 to properly position and move the smart card 30 within the card handling device 10. The first magnetic head 36 and the second magnetic head 38 receive and send data signals to the controller for writing to and reading from magnetic cards. The controller also interfaces with the contact type or non-contact type communication boards for communicating with the smart card.

Similarly, when a smart card is recycled, the process is executed after that card 30 reaches at the read/write position and the smart card 30 is read from to determine whether the card should be recycled. Typically, a smart card carrying a balance for use in debit transactions would not be recycled unless it was empty.

When the recycling signal is outputted from controller, the motor 234 is reversed and the smart card 30 is transported towards the card slot 34 by the second transporting unit 184 and first transporting unit 44. When the first sensor 256 senses the detect condition indicating the position of the smart card 30 adjacent to the first sensor 256, the motor 234 is stopped.

In this situation the leading end (right side shown in FIG. 2) of smart card 30 is located near the side of the second transporting unit 184 than the first board 80 of first base 64. At this point, the solenoid 178 is energized and the plunger 180 moves into the inside armature/coil region (towards the left side of FIG. 2), causing the rod 176 to follow the plunger 180. The rod 176 pulls the pin 174 causing the lever 170 to pivot in a clockwise manner about the shaft 168. This causes the roller 172 on the other end of the lever 170 to move to the right and cause the communication board attaching unit 16 to pivot to the recycling position. The roller 172 pushes the first base 64 through the elongated hole 166 causing the communication board attaching unit 16 to pivot on the third rotating shaft 88 in the clockwise direction as shown in FIG. 5. Accordingly, the guiding plate 212 crosses the transporting passageway 32 at an obtuse angle as shown in FIG. 5.

Once the communication board attaching unit 16 is moved to the recycling position, the motor 234 is energized to rotate, and the recycled smart card 30 is transported towards the right as shown in FIG. 5 by the first transporting unit 44 and the second transporting unit 184. The smart card 30 is then guided by the guiding plate 212 and slants to the right and falls down into the recycling section 210 in the outside of transporting passageway 32. In this process, the smart card 30 is forcibly diverted downwards because the second angle defined by the surface of the second guiding section 214 with the transporting passageway 32 is larger than the first angle defined by the first guiding section 212 with the transporting passageway 32.

The card naturally falls under the force of gravity into the transporting section of recycling section 210. After waiting a predetermined time for the recycled smart card to be diverted into the recycling section 210, the motor 234 is stopped. After this, the solenoid 178 is de-energized, and the plunger 180 again protrudes to the outside of the armature wound core under the force of a built-in spring. Therefore the lever 170 pivots in the counter clockwise direction and the communication board attaching unit 16 rotates in the counter clockwise direction and becomes level and aligned with the transporting passageway as shown in FIG. 4.

As described above, when dispensing a new smart card to a user as either a replacement or a new purchase, a new smart card 30 is transported from a new card storing section (not shown) which is located at the right side of the third transporting device 216 towards card receiving slot 34 by third transporting unit 216, second transporting unit 184 and first transporting unit 44.

When new card dispensing sensor (not shown) detects the new smart card 30 adjacent to the third transporting unit 216, the motor 234 stops and the new smart card 30 communicates through the communication boards to initialize the new smart card 30. Once the smart card is properly initialized with an account balance, or other desired information, the third transporting unit 216, the second transporting unit 184, and the first transporting unit 44 operate to dispense the newly programmed smart card 30 to a user through the receiving slot 34.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A smart card handling device including a communication board attaching unit for communicating with a non-contact type smart card, the communication board attaching unit being located along a transporting passageway for the smart card, the communication board attaching unit comprising:
   a first base; and
   a second base for detachably mounting to the first base, the second base having a first communication board attaching section and a second communication board attaching section for receiving a first communication board and a second communication board for communicating with a non-contact type smart card along the transporting passageway.

2. The smart card handling device of claim 1, wherein the first communication board attaching section and the second communication board attaching section are disposed adjacent to each other in a vertical stack.

3. The smart card handling device of claim 2, further comprising:
   a one-touch operating unit for attaching the second base to the first base,
   wherein the second base has an upper surface and when the second base is attached to the first base the upper surface of the second base defines a portion of the transporting passageway.

4. The smart card handling device of claim 2, wherein the second communication board attaching section is located between the first communication board attaching section and the second base upper surface, the first communication board and the second communication board being fixed in the second base by a fixing means.

5. The smart card handling device of claim 2, the first base further including:
   a third communication board attaching section for attaching a third communication board so that when the second base is attached the rear portion of the second base fixes the third communication board at the first base.

6. The smart card handling device of claim 2, further comprising:
   a contact type communication unit having a contact type communication board for attaching at the one-touch attaching section of the first base, the contact type communication board for communicating with a contact type smart card in the transporting passageway.

7. The smart card handling device of claim 2, the communication board attaching unit further comprising:
   a first guiding plate disposed adjacent to the lower surface of the communication board attaching unit,
   wherein when the communication board attaching unit pivots, the first guiding plate crosses the transporting passageway at a first angle.

8. The smart card handling device of claim 7, further comprising:

a second guiding plate attached adjacent to the first guiding plate, wherein when the communication board attaching unit pivots, the second guiding plate defines a plane that crosses the transporting passageway at a second angle, the second angle being larger than the first angle.

9. The smart card handling device of claim 8, further comprising:

a card receiving unit for receiving a card from a user, the card being one of a non-contact type smart card, a contact type smart card, and a magnetic type card;

a magnetic card handling unit for communicating with magnetic type cards;

a first transporting unit disposed between the card receiving unit and the magnetic card handling unit for transporting cards between the card receiving unit and the magnetic card handling unit along the transporting passageway; and a second transporting unit disposed between the magnetic card handling unit and the communication board attaching unit for transporting cards between the magnetic card handling unit and the communication board attaching unit along the transporting passageway.

10. The card handling device of claim 1, further comprising:

a fastener for releasably fastening the second base to the first base, wherein the fastener device is one of a screw and a one-touch fixing pin.

11. A smart card handling device including a transporting passageway for transporting the smart card within the smart card handling device, comprising:

a first base disposed adjacent to the transporting passageway;

a second base disposed adjacent to the transporting passageway and located opposite from the first base so that the transporting passageway defines a path between the first base and the second base, wherein the second base is one of a contact type smart card communication unit and a non-contact type smart card communication unit for communicating with a predetermined type of smart card located along the transporting passageway; and a one-touch attaching unit including a first one-touch attaching section and a second one-touch attaching section, the first one-touch attaching section being disposed between the transporting passageway and the first base and the second one-touch attaching section being disposed between the transporting passageway and the second base, the first one-touch attaching section and second one-touch attaching section forming complementary mating sections for mounting the second base to the first base.

12. A card handling device, comprising:

a card receiving unit for receiving a card from a user and transporting the card to the interior of the card handling device, the card receiving unit for dispensing a card to a user, the card being one of a magnetic card, a non-contact type smart card, and a contact type smart card;

a first transporting unit for receiving the card from the card receiving unit and reverseably transporting the received card along a transporting passageway;

a magnetic card handling unit for communicating with a magnetic card, the magnetic card handling unit being disposed along the transporting passageway and receiving a card from the first transporting unit;

a second transporting unit for receiving the card from the first transporting unit and reverseably transporting the card along the transporting passageway;

a communication board attaching unit for receiving one of a set of non-contact type communication boards for communicating with a non-contact type smart card and a set of contact type communication boards for communicating with a contact type smart card, wherein the communication board attaching unit includes a universal attachment section for releasably attaching one of the set of non-contact type and contact type communication boards; and a recycling unit for selectively pivoting the communication board attaching unit to block the transporting passageway and deflect the path of a transported card into a recycling section.

* * * * *